United States Patent [19]

Hayasaka

[11] 4,020,705
[45] May 3, 1977

[54] COARSE-FINE FOCUSING DEVICE FOR PRECISION MACHINERY

[75] Inventor: Toshimi Hayasaka, Hino, Japan

[73] Assignee: Olympus Optical Co., Ltd., Tokyo, Japan

[22] Filed: May 8, 1975

[21] Appl. No.: 575,702

Related U.S. Application Data

[63] Continuation of Ser. No. 394,474, Sept. 5, 1973, abandoned.

[30] Foreign Application Priority Data

Sept. 6, 1972  Japan .............................. 47-89312
Mar. 3, 1973  Japan .............................. 48-24773

[52] U.S. Cl. .......................... 74/10.54; 74/665 B; 350/86
[51] Int. Cl.² .................. F16H 35/18; G02B 21/26
[58] Field of Search ............ 74/10.52, 10.54, 10.8, 74/675, 665 B; 350/86

[56] References Cited

UNITED STATES PATENTS

| 1,503,553 | 8/1924 | Powell | 74/10.54 |
| 2,877,651 | 3/1959 | Erbe et al. | 74/10.52 |
| 3,019,705 | 2/1962 | Wilkinson | 74/10.52 X |
| 3,065,642 | 11/1962 | Capelle et al. | 74/10.8 X |
| 3,355,955 | 12/1967 | Aller | 74/10.52 |
| 3,385,116 | 5/1968 | Carlson et al. | 74/10.54 |
| 3,492,059 | 1/1970 | Shio | 350/46 |
| 3,683,704 | 8/1972 | Kuroha | 74/10.52 |

Primary Examiner—Samuel Scott
Assistant Examiner—Lance W. Chandler
Attorney, Agent, or Firm—Cushman, Darby & Cushman

[57] ABSTRACT

A coarse-fine focusing device for precision machinery capable of accurate coarse and fine adjustments free from any play in which a gear fixed to a pinion shaft having a pinion is connected to a gear fixed to a fine adjustment shaft, to which a fine adjustment handle is mounted, by a reduction gear mechanism provided in a coarse adjustment handle which is mounted coaxially with said fine adjustment handle.

2 Claims, 8 Drawing Figures

COARSE-FINE FOCUSING DEVICE FOR PRECISION MACHINERY

This is a continuation of application Ser. No. 394,474, filed Sept. 5, 1973, now abandoned.

BACKGROUND OF THE INVENTION

1. Field of the Invention

The present invention relates to a coarse-fine focusing device for precision machinery such as microscopes.

2. Description of the Prior Art

For focusing of precision machinery such as a microscope, coarse adjustment and fine adjustment are required. Therefore, two adjusting devices are required for focusing, i.e., a coarse adjusting device and fine adjusting device.

For most of conventional coarse adjusting devices and fine adjusting devices widely used in precision machinery such as microscopes, adjustment is carried out by two different guide mechanisms. For such guide mechanisms for focusing, accurate operation is required. When such guide mechanisms for which accurate operation is required are provided at two places, the focusing mechanism becomes very complicated, and consequently, the productivity becomes low and the cost becomes high.

Summary of the Invention

It is, therefore, the principal object of the present invention to provide a coarse-fine focusing device for precision machinery such as microscopes with one guide mechanism by providing the coarse adjustment shaft and fine adjustment shaft coaxially and by connecting those two shafts by a reduction gear mechanism.

Another object of the present invention is to provide a coarse-fine focusing device in which the right and left coarse adjustment shafts are connected with each other by another gear mechanism so that coarse adjustment can be carried out by either coarse adjustment handle which is fixed to each of said coarse adjustment shafts.

Still another object of the present invention is to provide a coarse-fine focusing device in which said right and left coarse adjustment handles are connected by a connecting shaft.

Still another object of the present invention is to provide a coarse-fine focusing device having a friction adjusting ring provided adjacent to one of said coarse adjustment handles.

Further details of the coarse-fine focusing device for precision machinery such as microscopes according to the present invention are described in the following referring to embodiments shown on the accompanying drawings.

DETAILED DESCRIPTION OF THE PREFERRED EMBODIMENTS

Figure 1:
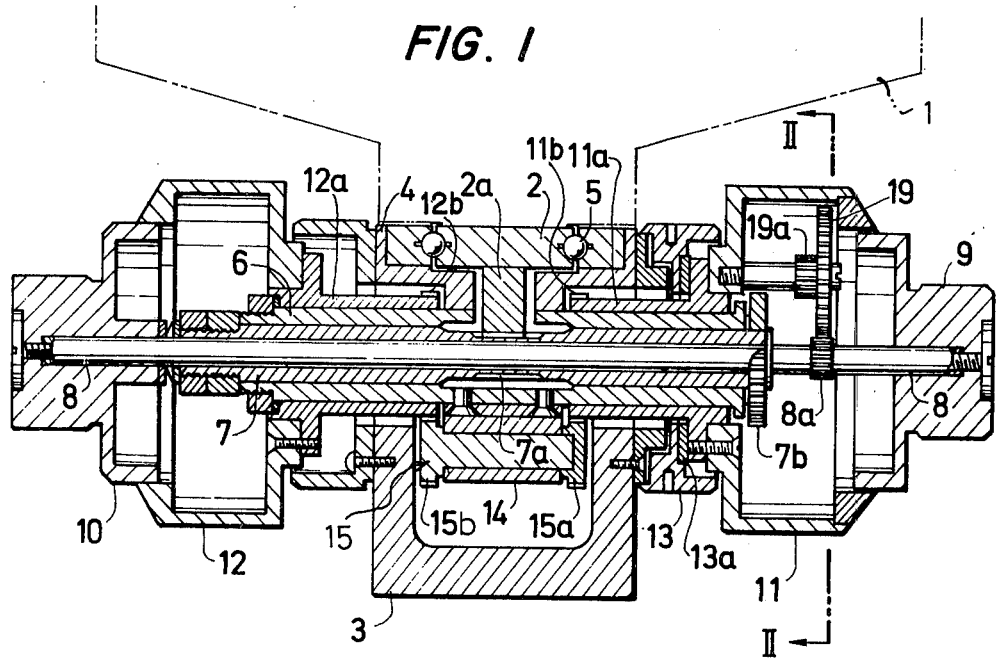
FIG. 1 shows a sectional view of an embodiment of the coarse-fine focusing device according to the present invention.

In FIG. 1, numeral 1 designates a stage of a microscope, numeral 2 designates a male ball race of a guide mechanism to which a rack 2a is mounted and said stage 1 is mounted to this male ball race 2, numeral 3 designates a microscope body, numeral 4 designates a female race of the guide mechanism fixed to the microscope body 3 and numeral 5 designates balls. Numeral 6 designates a bush which is fixed to the microscope body 3 and has an opening at the portion where the rack 2a is meshing with the pinion 7a. Numeral 7 designates a pinion shaft on which a pinion 7a is formed at a portion near the middle of said shaft and which is rotatably fitted into the bush 6. On one end of said pinion shaft 7, a gear 7b is fixed. Numeral 8 designates a fine adjustment shaft which is mounted passing through the inside of the pinion shaft 7 and can be rotated freely in the pinion shaft 7. To said fine adjustment shaft 8, a gear 8a is fixed. Numerals 9 and 10 designate fine adjustment handles respectively mounted at both ends of fine adjustment shaft 8. Numerals 11 and 12 respectively designates the right and left coarse adjustment handles. Of those handles, the right coarse adjustment handle 11 is fixed to the gear shaft 11a which is rotatably fitted onto the bush 6. In the same way, the left coarse adjustment handle 12 is fixed to the gear shaft 12a which is rotatably fitted onto the bush 6. Numeral 13 designates a friction adjusting ring for giving a suitably friction to the coarse adjustment handle 11 which is screwed onto the gear shaft 11a to which the coarse adjustment handle 11 is fixed. The friction adjusting ring 13 is arranged to give a certain suitably frictional force to the gear shaft 11a through a celluloid washer, spring washer or the like. Numeral 14 designates a bush fixed to the microscope body 3 and numeral 15 designates a gear shaft rotatably fitted in the bush 14 and having gears 15a and 15b at both ends. Said gears 15a and 15b respectively mesh with gears 11b and 12b which are formed on gear shafts 11a and 12a.

Figure 2:
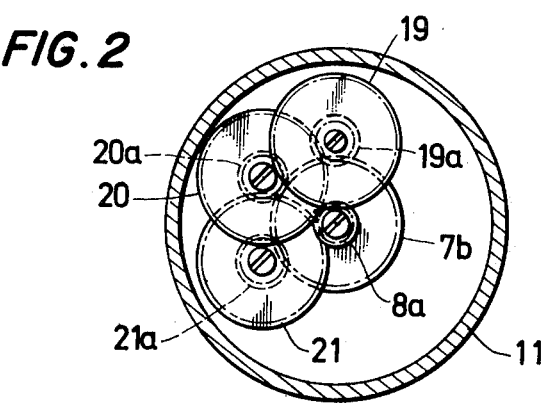
FIG. 2 shows a sectional view along the line II—II in FIG. 1.
Figure 3:
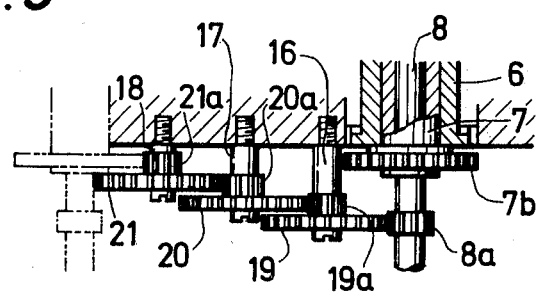
FIG. 3 shows a development of reduction gears employed in the coarse-fine focusing device according to the present invention.

Now referring to FIGS. 2 and 3, the reduction gear mechanism provided in the right coarse adjustment handle 11 is arranged as follows. FIG. 2 shows a sectional view taken along the line II—II in FIG. 1 and FIG. 3 shows a development of the reduction gear mechanism to clearly show how the large and small gears are meshing with each other. Numerals 16, 17 and 18 designate bearings respectively fixed to said coarse adjustment handle 11 to which reduction gears 19, 20 and 21 are rotatably mounted respectively. Besides, small gears 19a, 20a and 21a are also rotatably mounted to said bearings 16, 17 and 18 respectively. The gear 19 meshes with the small gear 8a, the gear 20 meshes with the small gear 19a, the gear 21 meshes with the small gear 20a and the small gear 21a meshes with the gear 7b. Therefore, when the gear 8a is rotated, this rotation is transmitted to the gear 7b being reduced through gears 19, 20 and 21 in turn.

When the fine adjustment handle 9 or 10 is rotated in the above-mentioned coarse-fine focusing device according to the present invention, the fine adjustment shaft 8 rotates. By this rotation of the fine adjustment shaft 8, the gear 8a fixed to the fine adjustment shaft 8 rotates and the gear 19 meshing with the gear 8a also rotates. Then, the rotation is transmitted through the gear 20 and gear 21 in turn as described in the above and is finally transmitted from the gear 21a to the gear 7b. By rotation of the gear 7b, the pinion shaft 7 is rotated and consequently the pinion 7a also rotates. Besides, the rack 2a, which meshes with the pinion 7a, moves in the direction vertical to drawing and, therefore, the ball race 2 and the stage 1 fixed to the ball race 2 moves in vertical direction. As this vertical movement is carried out through the reduction gear mechanism, the stage moves vertically by a very small amount when the fine adjustment handle 9 or 10 is rotated.

In this case, the weight of the stage is always applied to the pinion shaft as a rotational force. Therefore, this rotational force is transmitted also to respective gears and those gears rotate being free from any influence of backlash between respective gears. Consequently, even a slight turn of the fine adjustment handle is accurately transmitted as a vertical movement of the stage. Besides, when the coarse adjustment handle is rotated, each reduction gear also tends to rotate around its own axis. However, this rotational force is transmitted being reduced. On the other hand, a certain frictional force is applied to the fine adjustment shaft 8. Therefore the fine adjustment shaft 8 does not rotate. Thus, the coarse adjustment handle 11 and pinion shaft 7 rotate integrally. By rotation of this pinion shaft 7, the stage carries out its coarse movement through the pinion 7a, rack 2a and ball race 2 as described in the above. On the other hand, when the coarse adjustment handle 12 is rotated, the gear shaft 12a rotates, the gear 15a which meshes with the gear 12b rotates and gears 15b and 11b are also rotated in turn, thus the coarse adjustment handle 11 rotates. Consequently, the stage also performs its coarse movement in the same way. Thus, coarse movement of the stage can be carried out by both right coarse adjustment handle 11 and left coarse adjustment handle 12. Moreover, as the load of the microscope is always applied to gears through the rack 2a, it is possible to achieve vertical movement free from an influence of backlash.

Figure 4:
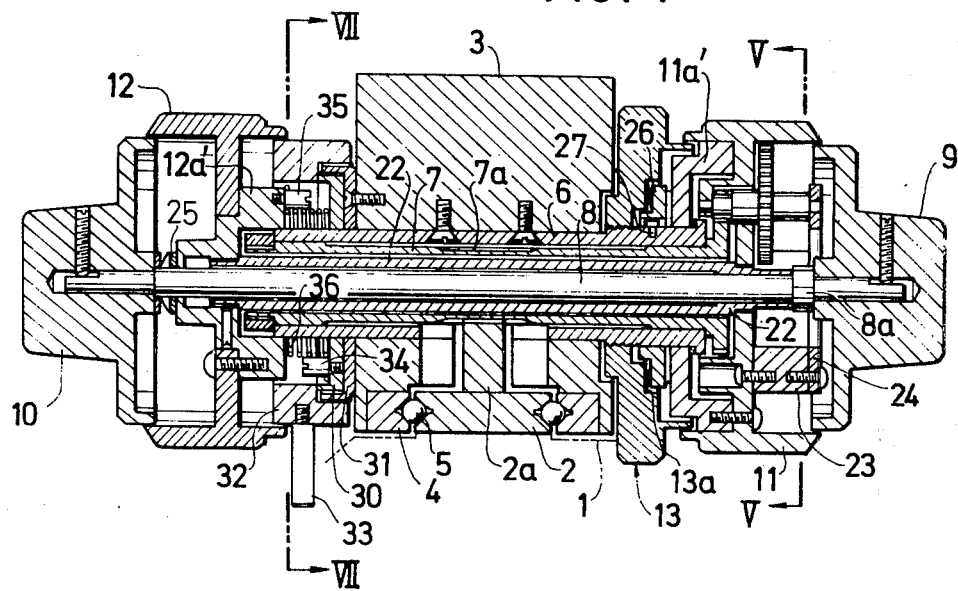
FIG. 4 shows a sectional view of another embodiment of the coarse-fine focusing device according to the present invention.
Figure 5:
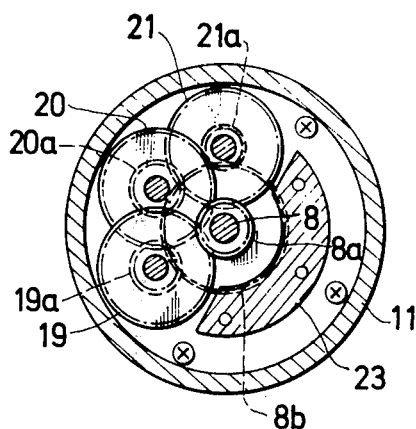
FIG. 5 shows a sectional view taken along the line V—V in FIG. 4.
Figure 6:
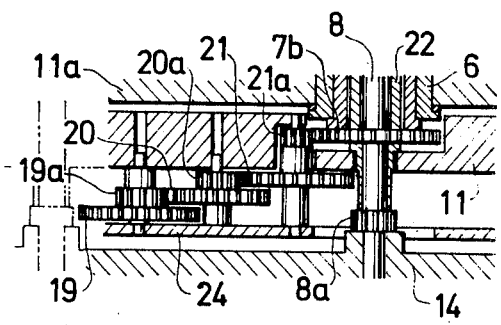
FIG. 6 shows a development of reduction gears employed in the embodiment of the present invention shown in FIG. 4.
Figure 7:
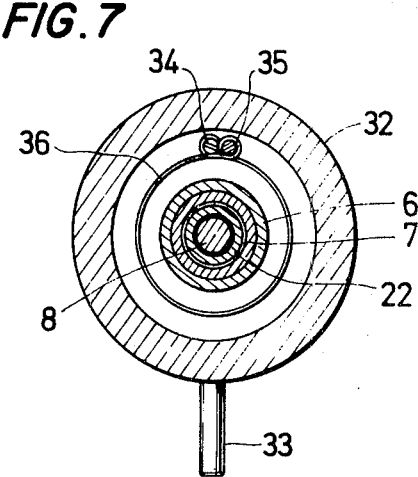
FIG. 7 shows a sectional view taken along the line VII—VII in FIG. 4.

Now, another embodiment of the present invention will be described in the following referring to FIGS. 4 through 8. This embodiment does not employ the gear mechanism comprising the gear shaft 15, etc. for connecting the right and left coarse adjustment handles 11 and 12 which was provided to the afore-mentioned first embodiment. Accordingly, instead of gear shafts 11a and 12a this second embodiment employs collars 11a' and 12a' which are fitted onto the bush 6 being rotatable freely. Besides, a connecting shaft 22 fixed to the right and left coarse adjustment handles is used instead of the gear mechanism in order to connect said both handles. Consequently, the right and left coarse adjustment handles rotate integrally and, therefore, the stage can be moved vertically by rotating either the right coarse adjustment handle or left coarse adjustment handle. Besides, in this second embodiment, reduction gears 19, 19a, 20, 20a, 21 and 21a are rotatably mounted between the coarse adjustment handle 11 and a shaft support 24 which is fixed to a circular arc member 23 mounted to the coarse adjustment handle 11 as shown in FIGS. 4 through 6. Besides, numeral 25 designates a spring for giving a suitable frictional force to the fine adjustment shaft. Furthermore, in this embodiment, another ring 26 is provided between the friction adjusting ring 13, which is screwed onto the bush 6, and the collar 11a' which is fixed to the coarse adjustment handle 11. Said ring 26 has an axial groove 26a and a pin 27 fixed to the bush 6 is projected into said groove 26a. By said pin 27, the ring 26 is prevented from rotating around the bush 6, thus the ring 26 can be moved only in axial direction. Therefore, when the friction adjusting ring 13 is rotated and is moved in axial direction, the force of the spring 13a is adjusted and, as a result, the frictional force to be applied to the collar 11a' hence to the coarse adjustment handle 11 can be adjusted to an adequate value by the force of said spring 13a. Moreover, as the ring 26 does not turn even when the coarse adjustment handle 11 is rotated, this rotation is not transmitted to the friction adjusting ring 13 at all. Eventually, the friction adjusting ring 13 does not get loosened to reduce the frictional force during operation of this focusing device.

Figure 8:
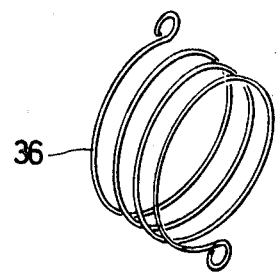
FIG. 8 shows a perspective view illustrating a coil spring in its free condition.

Besides, this embodiment is provided with a re-focusing position setting mechanism on the left handle side. The detail of construction of said mechanism is described below referring to FIGS. 7 and 8. That is, numeral 30 designates a rotary ring which is freely rotatable around the bush 6 and numeral 31 designates an annular member fixed to the microscope body 3. Numeral 32 designates an operating ring screwed into the annular member 31, numeral 33 designates an operating rod fixed to the operating ring 32, numeral 34 designates a pin fixed to the rotary ring 30 and numeral 35 designates another pin fixed to the collar 12a. Numeral 36 designates a spring both ends of which are respectively fixed to said pins 34 and 35, for example as shown in FIG. 8, and being wound around the bush 6. Therefore, when the operating ring 32 is in loosened condition, coarse adjustment and fine adjustment can be performed freely. (In this condition, pins 34 and 35 are pushed against each other by the spring 36.) However, when the operating ring 32 is turned by using the operating rod 33 and the rotary ring 30 is fixed being pushed by the operating ring 32 against the annular member 31 which is fixed to the microscope body 3, the pin 34 is fixed to the rotary ring 30 becomes unmovable. Therefore, even when it is wanted to rotate the coarse adjustment handle in the direction to raise the stage 1, the coarse adjustment handle cannot be rotated because the pin 35 fixed to the collar 12a is pushed against the pin 34. On the contrary, when the coarse adjustment handle is rotated in the direction to lower the stage 1, it can be turned approximately one rotation resisting against the force of the spring 36 until the handle is stopped when the pin 35 comes against the pin 34 from the opposite direction. That is, when the rotary ring 30 is fixed at the focused position after focusing by coarse and fine adjustments, the stage 1 can be moved downwards only and, then, can be returned to the above correctly focused position when the handle is returned. As this re-focusing position setting mechanism is completely independent of fine adjustment, it is possible to make fine adjustment freely even after fixing the rotary ring 30.

As this embodiment is basically of the same structure as the aforementioned first embodiment shown in FIGS. 1 through 3 except for the structure as described in the above, detailed description is omitted here.

Besides, it is evident that the mechanism comprising the friction adjusting ring 13, ring 26, etc. and the re-focusing position setting mechanism comprising the operating ring 32 etc. can be applied also to the first embodiment shown in FIGS. 1 through 3.

As described in the above, the coarse-fine focusing device according to the present invention has many advantages that coarse and fine adjustments can be carried out coaxially, the mechanism of the device is quite simple compared with the other devices of the same kind and, consequently, the production cost of the device is low, and accurate coarse and fine focusing adjustments free from any play can be made by either right or left handle, and so forth.

Furthermore, for high class microscopes or the like, various attachments are additionally mounted to the stage in many cases, and the weight applied to the stage changes when the attachment is changed. Therefore, it is necessary to re-adjust the frictional force given by the friction adjusting ring according to change of said weight.

In the second embodiment of the present invention, the frictional force can be adjusted by the friction adjusting ring quite easily as described in the above and, when once adjusted, the friction adjusting ring does not get loosened at all. Therefore, it is very effective when said mechanism is applied to a high class microscope.

Though the above description is made regarding a microscope, it is of course possible to apply the focusing device of the present invention also to various other precision machinery.

I claim:
1. A coarse-fine focusing device for a microscope comprising a sleeve fixed to the body of a microscope, a pinion shaft with a pinion rotatably fitted in said sleeve, a fine adjustment shaft rotatably fitted in said pinion shaft, right and left fine adjustment handles fixed at both ends of said fine adjustment shaft, right and left coarse adjustment handles provided coaxially with said fine adjustment handles and rotatably fitted to said sleeve, a gear fixed to said fine adjustment shaft, another gear provided to said pinion shaft, a reduction gear mechanism mounted to said coarse adjustment handle and connecting said two gears, a short bush arranged in parallel with said sleeve and fixed to said body, a gear shaft mounted to said bush and having gears at both ends thereof, and other two gear shafts respectively mounted to said right and left coarse adjustment handles and respectively having other gears meshing with said gears on said gear shaft.

2. A coarse-fine focusing device for microscope comprising a sleeve fixed to the body of a microscope, a pinion shaft with a pinion rotatably fitted in said sleeve, a fine adjustment shaft rotatably fitted in said pinion shaft, right and left fine adjustment handles fixed at both ends of said fine adjustment shaft, right and left coarse adjustment handles provided coaxially with said fine adjustment handles and rotatably fitted to said sleeve, a first gear fixed to said fine adjustment shaft, a second gear provided to said pinion shaft, a reduction gear mechanism mounted to said coarse adjustment handle and connecting said first and second gears, and a hollow connecting shaft rotatably fitted between said pinion shaft and said fine adjustment shaft and concentrically with said pinion shaft and said fine adjustment shaft, said right and left coarse adjustment handles being fixed at both ends of said connecting shaft.

* * * * *